United States Patent
Ye et al.

(10) Patent No.: US 12,223,173 B2
(45) Date of Patent: Feb. 11, 2025

(54) MEMORY CONTROLLER AND DATA PROCESSING METHOD FOR PROCESSING DISORDERED READ-OUT DATA

(71) Applicant: Silicon Motion, Inc., Hsinchu County (TW)

(72) Inventors: Bo-Chang Ye, Kaohsiung (TW); I-Ta Chen, New Taipei (TW); Wen-Shu Chen, Taipei (TW); Kuo-Cyuan Kuo, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 70 days.

(21) Appl. No.: 18/116,801

(22) Filed: Mar. 2, 2023

(65) Prior Publication Data
US 2023/0305711 A1 Sep. 28, 2023

(30) Foreign Application Priority Data
Mar. 23, 2022 (TW) .................................. 111110900

(51) Int. Cl.
*G06F 3/06* (2006.01)
(52) U.S. Cl.
CPC .......... *G06F 3/0613* (2013.01); *G06F 3/0656* (2013.01); *G06F 3/0679* (2013.01)
(58) Field of Classification Search
CPC .... G06F 3/0613; G06F 3/0656; G06F 3/0679; G06F 3/061; G06F 3/0659; G06F 3/0611
See application file for complete search history.

(56) References Cited

U.S. PATENT DOCUMENTS

| | | | |
|---|---|---|---|
| 2010/0169550 A1* | 7/2010 | Akita | G06F 12/0868 |
| | | | 711/E12.008 |
| 2019/0370199 A1* | 12/2019 | Tomlin | G06F 3/0673 |

FOREIGN PATENT DOCUMENTS

| | | |
|---|---|---|
| CN | 1612111 A | 5/2005 |
| TW | 201246083 A1 | 11/2012 |
| TW | 201800931 A | 1/2018 |
| TW | 201911055 A | 3/2019 |

* cited by examiner

*Primary Examiner* — Nanci N Wong
(74) *Attorney, Agent, or Firm* — Winston Hsu (57) ABSTRACT

A data processing method includes reading a memory device in response to a read command to respectively read multiple portions of predetermined data; respectively writing the portions in a buffer memory to complete data transfers of the portions of the predetermined data; sequentially providing access information corresponding to each portion of the predetermined data in response to completion of the data transfer of the corresponding portion; obtaining the access information of the predetermined data and accordingly generating multiple descriptors in chronological order of obtaining the access information; receiving and buffering the descriptors in a descriptor pool; sequentially selecting a latest descriptor from the descriptor pool according to a tag value and providing the latest descriptor to a direct memory access engine; and reading the buffer memory according to the latest descriptor to obtain at least a portion of the predetermined data by the direct memory access engine.

15 Claims, 5 Drawing Sheets

MEMORY CONTROLLER AND DATA PROCESSING METHOD FOR PROCESSING DISORDERED READ-OUT DATA

BACKGROUND OF THE INVENTION

1. Field of the Invention

The invention relates to a data processing method for processing disordered read-out data to improve the data processing efficiency and read operation efficiency of a memory controller.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state drives, Embedded Multi Media Cards (eMMC) and Universal Flash Storage (UFS)—have been used widely for a variety of purposes. Therefore, the demand for data storage devices in various fields has also grown significantly. Take the UFS as an example, because the UFS provides high transmission speed and high stability, it has been widely used in consumer electronic products such as digital cameras, smart phones, notebook computers, and desktop computers.

In view of this, how to improve the access speed of a Flash memory device has become an important issue.

SUMMARY OF THE INVENTION

It is an objective of the invention to improve the access speed of a Flash memory device.

According to an embodiment of the invention, a memory controller coupled between a host device and a memory device to control access operations of the memory device comprises a buffer memory, a memory interface, a microprocessor and a host interface. The memory interface is coupled to the buffer memory and the memory device and configured to read the memory device in response to a read command. The read command is issued by the host device to read predetermined data. The predetermined data comprises a plurality of portions. Different tag values are assigned to different portions of the predetermined data. The memory interface respectively reads the portions of the predetermined data from the memory device and writes the portions of the predetermined data that have been read from the memory device into the buffer memory to complete data transfer of the portions of the predetermined data, and sequentially provides access information corresponding to each portion of the predetermined data to a microprocessor in response to completion of the data transfer of the corresponding portion. The microprocessor is configured to obtain the access information of the portions of the predetermined data and accordingly generate a plurality of descriptors in response to the obtaining of the access information. The microprocessor directly generates and outputs the descriptors corresponding to the access information in chronological order of the obtaining of the access information. The host interface is coupled to the host device and the buffer memory and comprises a descriptor pool, a routing manager and a direct memory access (DMA) engine. The descriptor pool is configured to receive and buffer the descriptors. The routing manager is coupled to the descriptor pool and configured to sequentially select one descriptor from the buffered descriptors as a latest descriptor according to the tag values and provide the latest descriptor to the DMA engine. The DMA engine is coupled to the routing manager and configured to read the buffer memory according to the latest descriptor to obtain at least a portion of the predetermined data.

According to another embodiment of the invention, a data processing method comprises: reading a memory device in response to a read command to respectively read out a plurality of portions of predetermined data, wherein the read command is issued by a host device to read predetermined data and different tag values are assigned to different portions of the predetermined data; writing the portions of the predetermined data that have been respectively read out from the memory device into a buffer memory of a memory controller to respectively complete data transfer of the portions of the predetermined data; sequentially providing access information corresponding to each portion of the predetermined data in response to completion of the data transfer of the corresponding portion; obtaining the access information of the portions of the predetermined data and accordingly generating a plurality of descriptors in chronological order of obtaining the access information; receiving and buffering the descriptors in a descriptor pool; sequentially selecting one descriptor from the descriptors buffered in the descriptor pool as a latest descriptor according to the tag values and providing the latest descriptor to a direct memory access (DMA) engine by a routing manager; and reading the buffer memory according to the latest descriptor by the DMA engine to obtain at least a portion of the predetermined data.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
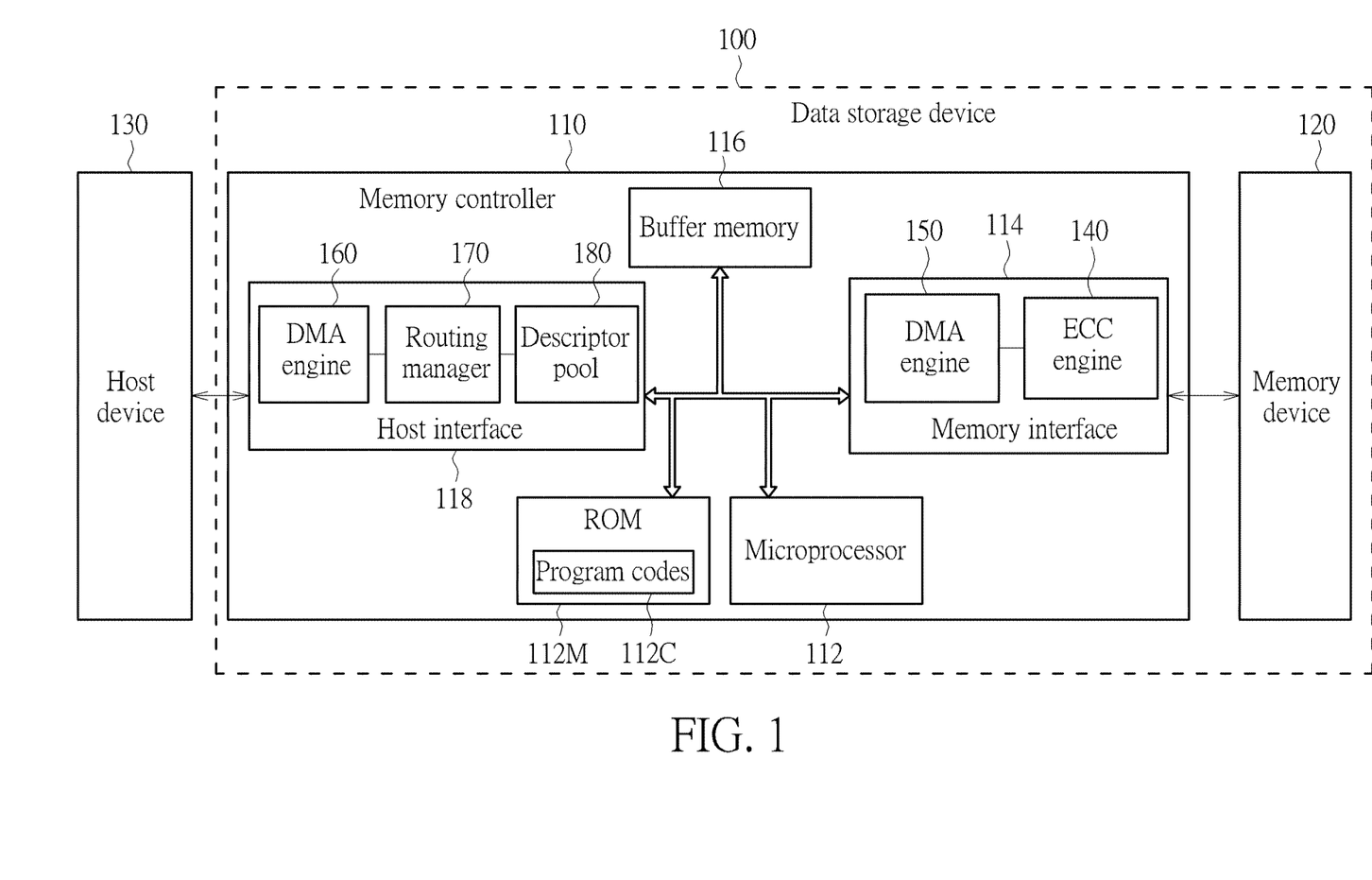
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise an internal data buffer (not shown in FIG. 1) for buffering data, so as to facilitate the ECC engine 140 to perform encoding and decoding operations on the data. In the write procedure to write data into the memory device 120, the ECC engine 140 encodes the data to be written to the memory device 120, such as performing error correction code encoding on the data to generate additional parity bits. In the read procedure to read data from the memory device 120, the ECC engine 140 decodes the data read from the memory device 120 to check and correct the error bits in the data when the error is correctable (as an example, the number of error bits in the data does not exceed the upper limit of the number of correctable error bits of the ECC engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 for providing data buffering may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard, the USB flash drives, or the likes), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

According to an embodiment of the invention, the memory interface 114 may further comprise a Direct Memory Access (DMA) engine 150 for performing data transfer operations, for example, to transfer data between the buffer memory 116 and the memory device 120, so as to assist the operation of accessing the memory device 120. Similarly, the host interface 118 may also comprise a DMA engine 160 to transfer data between the host device 130 (or, a corresponding data buffer or a bus) and the buffer memory 116. To simplify the drawing, the Direct Memory Access engines 150 and 160 are respectively labeled by DMA engine 150 and DMA engine 160 in FIG. 1.

In a read operation, the memory interface 114 reads data from the corresponding location of the memory device 120 through the DMA engine 150 according to the address information carried in the read command, and temporarily stores or buffers the data read from the memory device 120 (hereinafter referred to as Read-Out-Data) in the buffer memory 116. After the read-out data Read-Out-Data is transferred to the buffer memory 116, the memory interface 114 provides relevant information (hereinafter referred to as access information) of the data stored in the buffer memory 116 to the microprocessor 112, to trigger the data transfer operation of the host interface 118. For example, the DMA engine 160 of the host interface 118 further transfers the data stored in the buffer memory 116 to the data buffer or bus inside the host interface 118, and then the data will be provided to the host device 130 through the host interface 118.

Generally, the memory interface 114 provides the microprocessor 112 with the access information corresponding to the read-out data Read-Out-Data after the memory interface 114 completes the data transfer of the read-out data Read-Out-Data, so that the microprocessor 112 is able to immediately trigger the data transfer operation of the host interface 118 according to the obtained access information. However, the memory interface 114 may not complete the data transfer in the original order of the data. Here, the original order of the data may be defined based on the logical addresses of the data, and the logical addresses are the address used by the host device 130 to identify the data stored in the memory device 120. For example, assuming that the maximum data size that can be processed by the memory interface 114 in a read operation is 4 K bytes, if the host device 130 issues a read command with a data size of 16 K bytes, the memory interface 114 divides the 16 K bytes data to be read by this read command into four 4 K-byte portions, and the memory interface 114 correspondingly performs four read operations to respectively read the four portions. Since the time takes by each read operation is not necessarily the same, the four portions may not be written into the buffer memory 116 in the same order as the original order of the data, when inspecting along the time axis. For example, the memory interface 114 may first complete the write operation of the $4^{th}$ portion of the aforementioned 16 K bytes data, and then complete the write operation of the $3^{rd}$ portion, wherein the $4^{th}$ portion follows the $3^{rd}$ portion in the original 16 K bytes data, therefore the logical memory addresses corresponding to the data in the $4^{th}$ portion follow the logical memory addresses corresponding to the data in the $3^{rd}$ portion.

This phenomenon is more likely to occur when the memory interface 114 is designed to utilize a multi-channel architecture to perform access operations on the memory device 120. Since multiple channels are configured to process read operations corresponding to multiple read commands at the same time, the aforementioned disorder phenomenon will be more obvious.

When the read-out data Read-Out-Data is written into the buffer memory 116 disorderly, the access information sequentially provided by the memory interface 114 in response to the completion of data transfer or the access information sequentially collected by the microprocessor 112 is also disordered when inspecting along the time axis. That is, the access information is not arranged in the same order as the original order of the data, wherein as mentioned above, the original order of the data may be defined based on the logical addresses of the data. For example, for several pieces of data with consecutive logical addresses, the microprocessor 112 may not be able to collect the corresponding access information in the order of increasing (or decreasing) logical addresses thereof.

Figure 2:
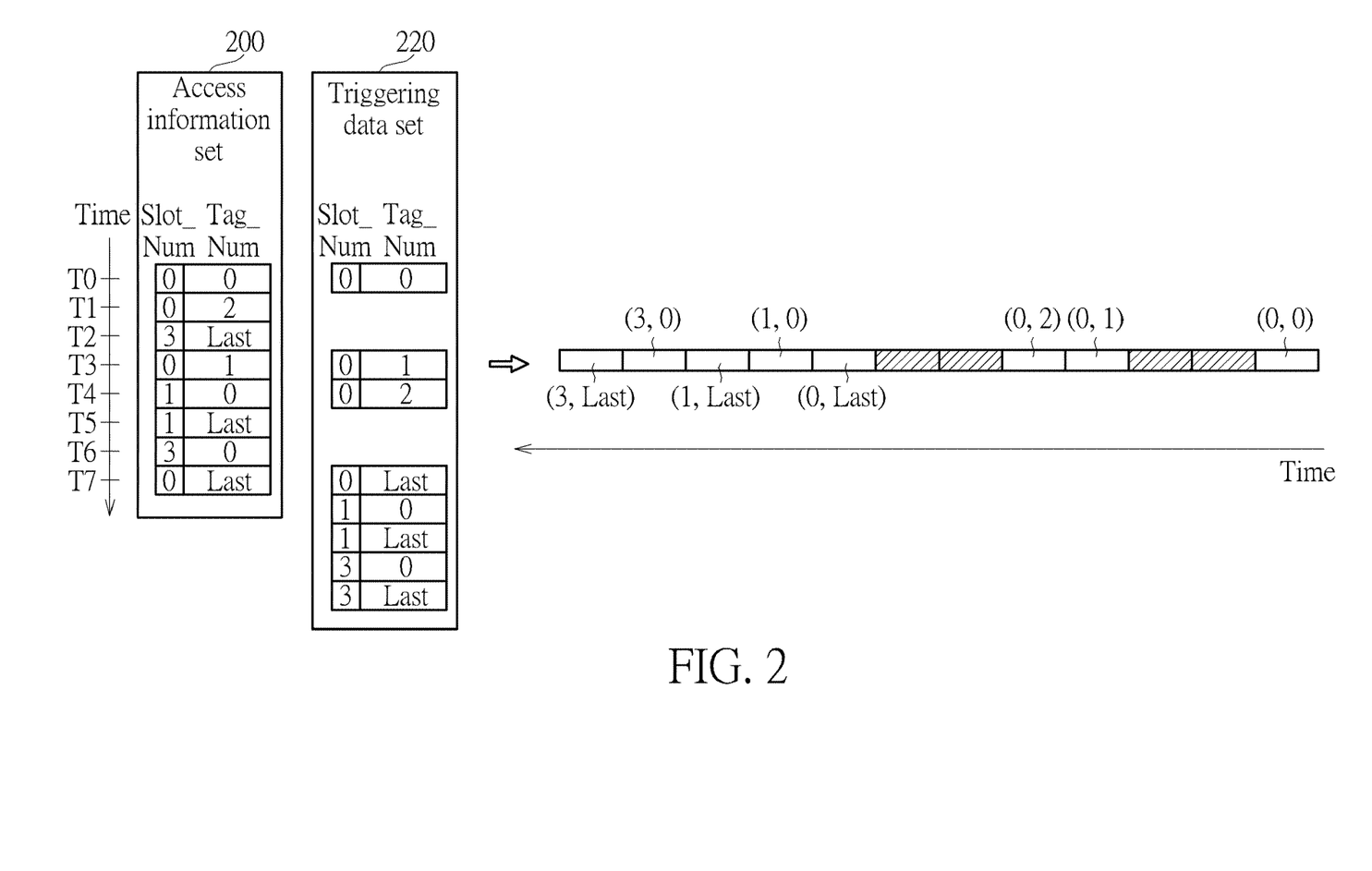
FIG. 2 is a schematic diagram showing the data transfer operation of the host interface triggered by the microprocessor according to the obtained access information in an embodiment of the invention.

FIG. 2 is a schematic diagram showing the data transfer operation of the host interface triggered by the microprocessor 112 according to the obtained access information in an embodiment of the invention. The access information set 200 is a set of the aforementioned access information sequentially provided by the memory interface 114 in response to the completion of data transfer or sequentially collected by the microprocessor 112. The access information set 200 is a collection of multiple pieces of access information. For example, in FIG. 2, the content in each row of the access information set 200 represents a piece of access information. A piece of access information corresponds to a piece of data stored in the buffer memory 116 or corresponds to the piece of data written in the buffer memory 116 in one write operation, and may comprise at least the information regarding a slot number Slot_Num and a tag value Tag_Num. According to an embodiment of the invention, a read command issued by the host device 130 may be assigned a corresponding slot number Slot_Num, for example, an integer value such as 0, 1, 2, 3 . . . , and in order to distinguish a plurality of read commands received from the host device 130 within a predetermined time interval, different slot numbers are assigned to different read commands that have been received within the predetermined time interval. That is, different read commands will correspond to different slot numbers Slot_Num.

In addition, as mentioned above, since the memory interface 114 may divide the predetermined data to be read by a read command into multiple portions and correspondingly perform multiple times of read operations, different portions of the predetermined data are assigned different tag values Tag_Num, but the overall portions of the predetermined data corresponding to a predetermined read command will be assigned the same slot number. For example, if the host device 130 sends a read command with a data size of 16 K bytes as described above, the memory interface 114 assigns the same slot number to the 16 K bytes data to be read by the read command, and may further divide the 16 K bytes data into four 4 K-byte portions. The tag values sequentially assigned to these four portions of data may be 0, 1, 2, and Last, or any other continuous or increasing sequence, where the 'Last' is used to represent the last portion of the data. For another example, if the host device 130 issues a read command to read predetermined data having the logical addresses from the Logical Block Address (LBA) LBA1 to LBA 16, the memory interface 114 may divide the predetermined data into multiple portions, for example, 2, 4 or 8 portions. Assuming that the memory interface 114 is capable of handling the data of two LBAs in one read operation, the predetermined data may be divided into 8 portions, and the 8 portions may be assigned the same slot number as described above, but different tag values are sequentially assigned to these eight portions, such as 0, 1, 2, . . . , Last, or 0, 2, 4, 6, 8, 10 12 and 14. In other words, in the embodiment of the invention, the series of tag values Tag_Num may be set as a continuous and increasing (or decreasing) integer sequence, or may be set as the offsets of memory address recognizable by the DMA engine 160, which may be an increasing (or decreasing) sequence, or a sequence of values that increase (or decrease) by equal amounts, so that the DMA engine 160 is able to deduce the information about from which memory address of the buffer memory 116 to obtain the portion of data corresponding to each tag value Tag_Num with the knowledge of a starting address of the predetermined data in the buffer memory 116 and the corresponding tag value. Therefore, in the embodiment of the invention, the tag values assigned to the plurality of portions of predetermined data may have a predetermined order, and this predetermined order may be a numerically increasing (or descending) order, or a numerically continuous order, or other specific order sufficient to identify the original sequence of the predetermined data or the original sequence of the logical addresses of the predetermined data.

In FIG. 2, the arrow pointing downward on the far left side represents the time axis, on which the points of time T0~T7 are shown, for indicating the chronological order of obtaining the access information, wherein the access information corresponding to time T0 with the slot number Slot_Num 0 and the tag value Tag_Num 0 is the earliest obtained access information in the access information set 200, and the access information corresponding to time T7 with the slot number Slot_Num 0 and the tag value Tag_Num Last is the latest obtained access information in the access information set 200. As mentioned above, because the time takes by each read operation is not necessarily the same, the microprocessor 112 may not be able to collect the corresponding access information according to the original order of the data, and may be even unable to collect the access information of successive read commands according to the order in which the read commands are received.

FIG. 2 also shows a triggering data set 220 generated by the microprocessor 112 based on the obtained access information. The triggering data set 220 may be a collection of multiple pieces of triggering data. For example, in FIG. 2, the content in each row of the triggering data set 220 represents a piece of triggering data to trigger a data transfer operation, and the access information corresponding to each triggering data is illustrated as the corresponding slot number Slot_Num and tag value Tag_Num. Because the data transfer operation of the host interface 118 has to be triggered in a correct order (that is, the aforementioned original order of the data or the aforementioned order of increasing (or decreasing) logical addresses), in this embodiment, as shown in FIG. 2, after receiving the first access information with the slot number Slot_Num 0 and the tag value Tag_Num 0 and the second access information with the slot number Slot_Num 0 and the tag value Tag_Num 2, since the second access information is not the access information in the correct order (that is, the second access information is not the access information corresponding to a next portion of data or a subsequent piece of data following the data corresponding to the first access information), the microprocessor 112 may only generate the first triggering data according to the first access information and then have to wait (e.g. performing a waiting operation) until the access information in the correct order, as an example, the third access information with the slot number Slot_Num 0 and the tag value Tag_Num 1, is received. After the access information in the correct order is collected, the microprocessor 112 may generate the second triggering data according to the third access information and generate the third triggering data according to the second access information, and the rest may be deduced by analogy.

The triggering data generated by the microprocessor 112 will be provided to the DMA engine 160 of the host interface 118 to trigger the data transfer operation of the DMA engine 160, for further transferring the data stored in the buffer memory 116 to data buffer or bus inside the host interface 118. The triggering data may be provided directly to the DMA engine 160 after being appended with other necessary information (e.g., source starting address and target starting address, data size to be transferred, etc.). Or, the microprocessor 112 may further add some other additional information (for example, status information, etc.) in the triggering data and provide the triggering data to the DMA engine 160. Or, the microprocessor 112 may generate a corresponding descriptor according to the triggering data or according to the triggering data and other necessary and/or additional information and provide the descriptor to the DMA engine 160. It should be noted that the invention is not limited to any specific way of implementation. It should be further noted that although the invention is not limited to any specific way of implementation, for simplicity, the term 'descriptor' will be used in the following paragraphs as a representation of above-mentioned possible implementations.

In the right side of FIG. 2, a plurality of descriptors provided by the microprocessor 112 to the DMA engine 160 are shown, and the right-to-left arrow drawn below represents the time axis, to show the chronological order of providing the descriptors. The values (X, Y) filled in the grids shows that the descriptor is corresponding to the triggering data whose slot number is X and tag value is Y, and the grids filled with slashes represent the periods during which the microprocessor 112 cannot provide the descriptors due to the waiting operation. As shown in FIG. 2, since the DMA engine 160 cannot continuously receive the descriptors, the efficiency of the read operation is greatly affected.

To solve the above problems, in other embodiments of the invention, a routing manager 170 and a descriptor pool 180 are further configured in the host interface 118, wherein the descriptor pool 180 is configured to receive and temporarily store the descriptors provided by the microprocessor 112, so that the microprocessor 112 does not have to waste the time to wait for the access information in the correct order, and is able to directly generate corresponding descriptors according to the obtained or collected access information and directly provide the generated descriptors to the host interface 118 instead. That is, in the embodiments of the invention, the microprocessor disregards or does not consider (or, ignores) the continuity of the tag values carried in the access information or the predetermined order of the tag values, and simply outputs the descriptor corresponding to each access information in chronological order of the obtaining of the access information.

In this manner, the microprocessor 112 may efficiently complete the triggering of the host interface 118 to perform data transfer operations in a shorter time, without wasting the time required for waiting for the accessing information. When the microprocessor 112 completes the task of triggering the host interface 118, the microprocessor 112 may execute other tasks of the memory controller 110. Therefore, the data processing efficiency of the memory controller 110 is effectively improved as well.

Figure 3:
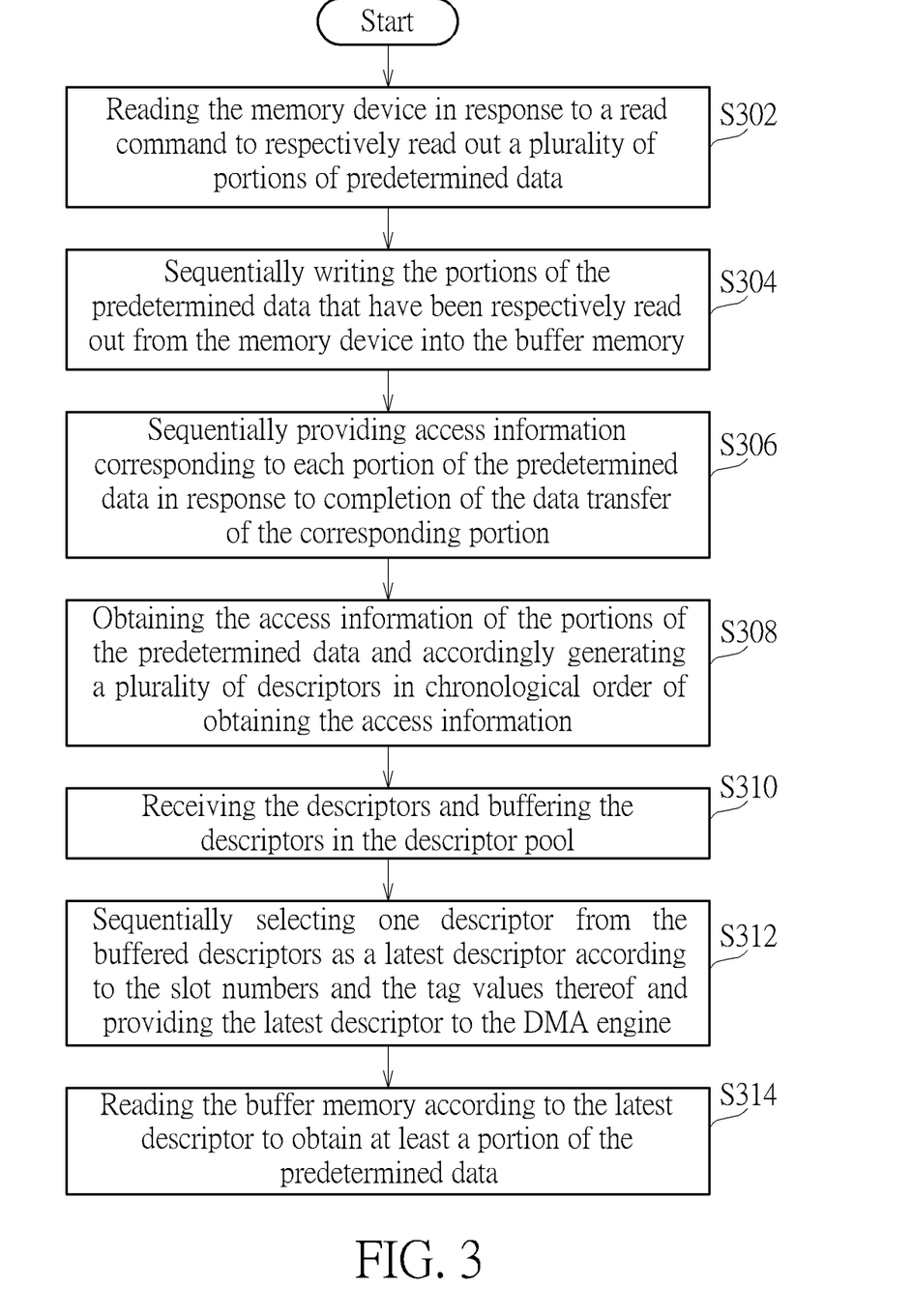
FIG. 3 shows an exemplary flow chart of a data processing method according to an embodiment of the invention.

FIG. 3 shows an exemplary flow chart of a data processing method for processing disordered read-out data according to an embodiment of the invention. The data processing method comprises the following steps:

Step S302: reading the memory device 120 in response to a read command to respectively read out a plurality of portions of predetermined data, wherein the read command is issued by the host device 130 to read predetermined data, and as mentioned above, different tag values are assigned to different portions of the predetermined data and the tag values are assigned to the portions of the predetermined data in a predetermined order or based on a predetermined order in accordance with the original order of the predetermined data.

Step S304: sequentially writing the portions of the predetermined data that have been respectively read out from the memory device into the buffer memory 116 of the memory controller 110 to respectively complete data transfer of the portions of the predetermined data.

Step S306: sequentially providing access information corresponding to each portion of the predetermined data in response to completion of the data transfer of the corresponding portion.

In an embodiment of the invention, the microprocessor 112 of the memory controller 110 may trigger the memory interface 114 to perform steps S302 and S304 in response to the received read command, so as to complete the first phase of data transfer of the predetermined data. In addition, in some embodiments of the invention, step S306 may be performed by the memory interface 114, but in some other embodiments of the invention, step S306 may also be replaced by the operation of actively collecting the access information corresponding to each portion of the predetermined data by the microprocessor 112 in response to completion of the data transfer of the corresponding portion (for example, the memory interface 114 may notify the microprocessor 112 of the completion of the data transfer after the data transfer is done).

Step S308: obtaining the access information of the portions of the predetermined data and accordingly generating a plurality of descriptors in chronological order of obtaining the access information. In an embodiment of the invention, step S308 may be performed by the microprocessor 112, and after generating a descriptor, the microprocessor 112 may directly provide the descriptor to the host interface 118. In addition, in the embodiment of the invention, the access information may comprise information regarding a slot number and a tag value corresponding to each portion of the predetermined data to be read by the host device 130, and the descriptor (or, the aforementioned triggering data) may also comprise the information regarding the slot number and the tag value, so as to inform the host interface 118 of the information regarding the slot number and tag value corresponding to the data currently stored in the buffer memory 116. Next, steps S310-S314 to be introduced are the internal operations of the host interface 118 to complete the second phase of data transfer of predetermined data.

Step S310: receiving the descriptors by the descriptor pool 180 of the host interface 118 and buffering the descriptors in the descriptor pool 180. In some embodiments of the invention, the descriptor pool 180 may be implemented by one or more registers.

Step S312: sequentially selecting one descriptor from the buffered descriptors (i.e. the descriptors buffered in the descriptor pool 180) as a latest descriptor by the routing manager 170 according to the slot numbers and the tag values thereof and providing the latest descriptor to the DMA engine 160. It is to be noted that, in the embodiments of the invention, the routing manager 170 may comprise a plurality of routing engines (shown in FIG. 4), the routing engines may correspond to different slot numbers, and each routing engine is configured to dedicatedly process the descriptor(s) having the same slot number thereof (that is, the descriptor(s) having the same slot number as the slot number assigned to the corresponding routing engine), therefore, the operation of step S312 may also be expressed as retrieving one descriptor from the descriptors buffered in the descriptor pool 180 according to the predetermined order of tag values by each routing engine.

Step S314: reading the buffer memory 116 according to the latest descriptor by the DMA engine 160 to obtain at least a portion of the predetermined data.

After obtaining the predetermined data or at least a portion of the predetermined data, the DMA engine 160 may further transmit the obtained data to the data buffer or bus inside the host interface 118. Then, after combining the portions of the predetermined data in the correct order (that is, the original order of the data) and packaging the predetermined data in compliance with the afore-mentioned standard communication protocol (for example, the UFS interface standard) by the host interface 118, the predetermined data is provided to the host device 130.

Figure 4:
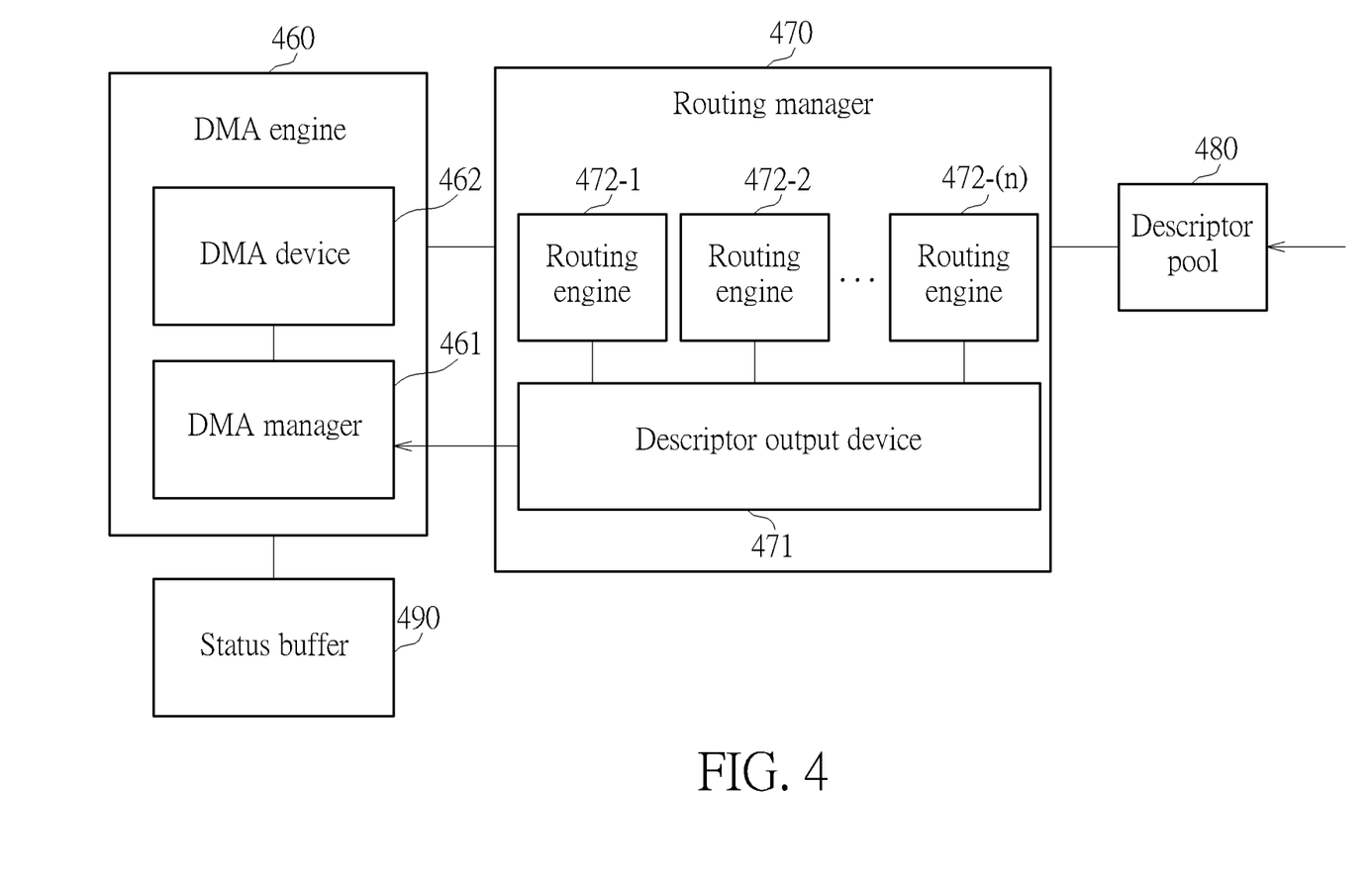
FIG. 4 shows an exemplary block diagram of the DMA engine, the routing manager, and the descriptor pool configured in the host interface according to an embodiment of the invention.

FIG. 4 shows an exemplary block diagram of the DMA engine, the routing manager, and the descriptor pool configured in the host interface according to an embodiment of the invention. In an embodiment of the invention, the microprocessor 112 may directly and continuously provide descriptors to the descriptor pool 480. For example, the microprocessor 112 may directly generate and output a descriptor corresponding to each pieces of access information in response to the obtained or collected access information. Therefore, in the embodiment of the invention, the microprocessor 112 may directly generate the descriptors corresponding to the access information in chronological order of the obtaining of the access information, and the directly provide the generated descriptors to the descriptor pool 480.

The routing manager 470 may comprise a descriptor output device 471 and a plurality of routing engines 472-1, 472-2 . . . 472-(n), wherein n is a positive integer. In the embodiments of the invention, different slot numbers may be assigned to different routing engines. Therefore, the routing engines 472-1, 472-2 . . . 472-(n) may respectively correspond to different slot numbers, and may be configured to retrieve one descriptor having the corresponding slot number thereof (i.e., the same slot number as one assigned to the routing engine) from the buffered descriptors as a target descriptor according to a predetermined order of the tag values. The descriptor output device 471 is coupled to the routing engines 472-1, 472-2 . . . 472-(n), and may act as an arbiter to receive the target descriptors respectively retrieved by the routing engines from the corresponding routing engines 472-1, 472-2 . . . 472-(n), and sequentially select one of the target descriptors as the latest descriptor, so as to sequentially output one of these object descriptors. For example, the descriptor output device 471 may select one of the target descriptors retrieved by the routing engines 472-1, 472-2 . . . 472-(n) by turns in a round robin manner and output the one as the latest descriptor. In other embodiments, the routing engines 472-1, 472-2 . . . 472-(n) may also be given different priorities, and the descriptor output device 471 may sequentially select and output a corresponding target descriptor as the latest descriptor based on the priorities.

The DMA engine 460 may comprise a direct memory access manager 461 (hereinafter referred to as the DMA manager 461) and a direct memory access device 462 (hereinafter referred to as the DMA device 462). The DMA manager 461 may sequentially receive the latest descriptors currently obtained by the descriptor output device 471, and translate the latest descriptors to the necessary information or the information recognizable by the DMA device 462, and then provide the translated information to the DMA Device 462. The DMA device 462 may read the buffer memory 116 according to the information provided by the DMA manager 461, so as to obtain at least a portion of the data to be read by the host device.

In some embodiments of the invention, after the DMA device 462 completes the data transfer, the DMA device 462 may further report a status of the data transfer operation, and the host interface 118 may further include a status buffer 490 for temporarily storing the status reported by the DMA device 462. The microprocessor 112 may access the status buffer 490 to obtain required status information.

Figure 5:
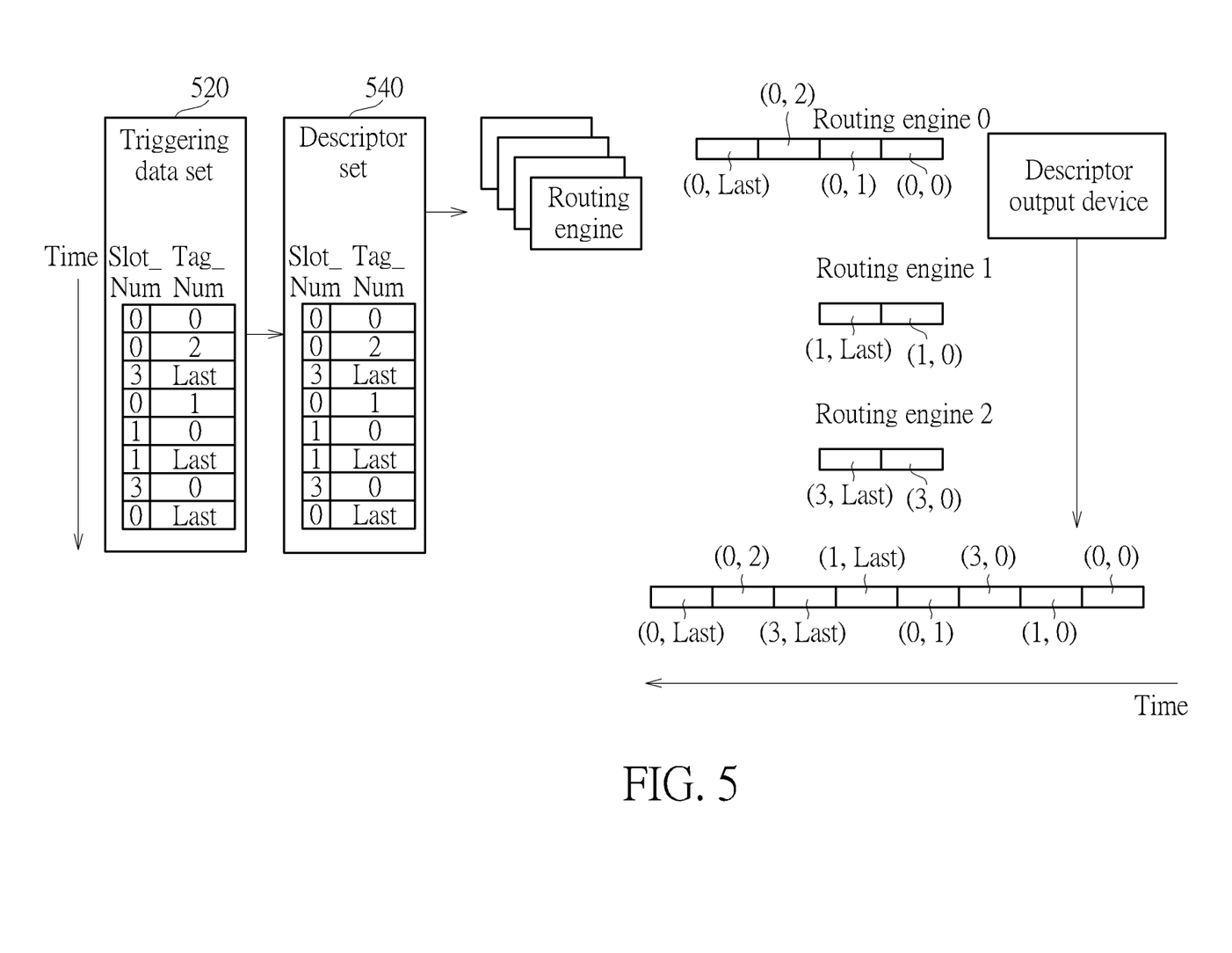
FIG. 5 is a schematic diagram showing the descriptor processing flow in the host interface according to an embodiment of the invention.

FIG. 5 is a schematic diagram showing the descriptor processing flow in the host interface according to an embodiment of the invention. Continuing the example of the access information set 200 shown in FIG. 2, the triggering data set 520 is a collection of triggering data generated by the microprocessor 112 according to the obtained access information in the access information set 200, or, as mentioned above, may also represent a collection of descriptors generated by the microprocessor 112 according to the access information, the triggering data or other necessary information. The descriptor set 540 is a collection of descriptors stored in the descriptor pool 480. As shown in FIG. 5, in the embodiments of the invention, since the microprocessor 112 directly and continuously provides descriptors to the descriptor pool 480, when inspecting along the time axis, the corresponding data sequence of the triggering data set 520 is the same as the data sequence of the descriptor set 540.

As mentioned above, a read command issued by the host device 130 is assigned a slot number Slot_Num, and the routing engines 472-1, 472-2 . . . 472-(n) may respectively correspond to different slot numbers, to dedicatedly process the descriptor(s) with the corresponding slot number thereof. Assuming that routing engine 472-1 (labeled as routing engine 1 in FIG. 5) corresponds to slot number 0, and routing engine 472-2 (labeled as routing engine 2 in FIG. 5) corresponds to slot number 1 and routing engine 472-3 (marked as routing engine 3 in FIG. 5) corresponds to the slot number 3, the routing engine 472-1 is configured to retrieve the descriptors with the slot number 0 from the buffered descriptors according to the predetermined order of the tag values assigned to the descriptors having the slot number 0, the routing engine 472-2 is configured to retrieve the descriptors with the slot number 1 from the buffered descriptors according to the predetermined order of the tag values assigned to the descriptors having the slot number 1, the routing engine 472-3 is configured to retrieve the descriptors with the slot number 2 from the buffered descriptors according to the predetermined order of the tag values assigned to the descriptors having the slot number 2, and the rest may be deduced by analogy.

In an embodiment of the invention, the predetermined order may be a numerically continuous order or an increasing order. The routing engines 1, 2, and 3 may set the target descriptors to be retrieved according to the predetermined order of the tag values (for example, setting the slot number and tag value to be retrieved at present), so that the data or the portion of data pointed by the target descriptor is the subsequent data or the subsequent portion of the data following the data pointed by a previously retrieved descriptor, and then respectively retrieve the target descriptors from the descriptors buffered in the descriptor pool 480. The target descriptor to be retrieved has the same slot number as the corresponding routing engine and the corresponding tag value currently set by the corresponding routing engine. The target descriptors sequentially retrieved by the routing engines 1, 2, and 3 are provided to the descriptor output device 471, and the descriptor output device 471 sequentially selects one of them to output.

The right side of FIG. 5 shows the descriptors sequentially retrieved by the respective routing engines 1, 2, and 3, and the descriptors sequentially output by the descriptor output device 471, and the right-to-left arrow shown below represents the time axis, which also shows the chronological order of the output descriptors. The values (X, Y) filled in the grids shows that the descriptor is corresponding to the access information with slot number X and tag value Y. As shown in FIG. 5, the routing engines 1, 2, and 3 will retrieve the corresponding descriptors according to the predetermined order of tag values, and the descriptor output device 471 will sequentially provide the descriptors to the DMA engine according to arbitration mechanism defined therein.

It should be noted that although the predetermined order in this example is a numerically continuous order or an ascending or increasing order, in other embodiments of the invention, the predetermined order may also be a descending or decreasing order.

In the embodiment of the invention, the different portions of the predetermined data corresponding to a read command may be assigned different tag values based on a predetermined order or in a predetermined order. Different from the embodiment shown in FIG. 2, in the embodiment shown in FIG. 5, the microprocessor 112 disregards or does not consider the predetermined order of the tag values, and simply outputs the descriptors corresponding to each access information in chronological order of the obtaining of the access information. That is, the microprocessor 112 immediately outputs the corresponding descriptor in response to the newly obtained access information. Then, the routing engines in the routing manager are utilized to retrieve the descriptors arranged in the correct order according to the predetermined order of the tag values, so that the data transfer operations of the host interface 118 are triggered in the correct order (that is, the aforementioned original order of the data or in the order of increasing (or decreasing) logical addresses). In this way, the microprocessor 112 is able to efficiently complete the triggering of the host interface 118 for performing data transfer operations in a shorter time, without wasting the time required for waiting for the accessing information. In addition, the DMA engine 160 also does not have to waste time waiting for the arrival of the descriptor, and is able to continuously execute the data transfer operation, so that both the data processing efficiency and the read operation efficiency of the memory controller 110 are effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method, comprising:
reading a memory device in response to a read command to respectively read out a plurality of portions of predetermined data, wherein the read command is issued by a host device to read predetermined data and different tag values are assigned to different portions of the predetermined data;
writing the portions of the predetermined data that have been respectively read out from the memory device into a buffer memory of a memory controller to respectively complete data transfer of the portions of the predetermined data from the memory device to the buffer memory;
sequentially providing access information corresponding to each portion of the predetermined data in response to completion of the data transfer of the corresponding portion;
obtaining the access information of the portions of the predetermined data and accordingly generating a plurality of descriptors in chronological order of obtaining the access information;
receiving and buffering the descriptors in a descriptor pool;
sequentially selecting one descriptor from the descriptors buffered in the descriptor pool as a latest descriptor according to the tag values and providing the latest descriptor to a direct memory access (DMA) engine by a routing manager; and
reading the buffer memory according to the latest descriptor by the DMA engine to obtain at least a portion of the predetermined data.

2. The data processing method as claimed in claim 1, wherein the descriptor pool, the routing manager and the DMA engine are configured in a host interface of the memory controller.

3. The data processing method as claimed in claim 1, further comprising:
assigning different slot numbers to a plurality of routing engines of the routing manager;
retrieving, by one of the routing engines, one descriptor having the same slot number as the slot number of said one of the routing engines from the buffered descriptors as a target descriptor according to a predetermined order of the tag values; and
receiving the target descriptors from the routing engines and sequentially selecting one of the target descriptors as the latest descriptor.

4. The data processing method as claimed in claim 3, wherein the predetermined order is an increasing order.

5. The data processing method as claimed in claim 3, wherein the portions of the predetermined data are assigned the same slot number.

6. The data processing method as claimed in claim 3, wherein different slot numbers are corresponding to different read commands.

7. The data processing method as claimed in claim 5, wherein the access information corresponding to each portion of the predetermined data comprises the slot number and the tag value corresponding to said each portion of the predetermined data.

8. The data processing method as claimed in claim 1, wherein the portions of the predetermined data are assigned different tag values based on a predetermined order, and when performing step of sequentially providing access information corresponding to each portion of the predetermined data in response to completion of the data transfer of the corresponding portion, the predetermined order of the tag values is not considered.

9. A memory controller, coupled between a host device and a memory device to control access operations of the memory device, comprising:
a buffer memory;
a memory interface, coupled to the buffer memory and the memory device and configured to read the memory device in response to a read command, wherein the read command is issued by the host device to read predetermined data, the predetermined data comprises a plurality of portions, different tag values are assigned to different portions of the predetermined data, the memory interface respectively reads the portions of the predetermined data from the memory device and writes the portions of the predetermined data that have been read from the memory device into the buffer memory to complete data transfer of the portions of the predetermined data from the memory device to the buffer memory, and sequentially provides access information corresponding to each portion of the predetermined data to a microprocessor in response to completion of the data transfer of the corresponding portion;
the microprocessor, configured to obtain the access information of the portions of the predetermined data and accordingly generate a plurality of descriptors in response to the obtaining of the access information, wherein the microprocessor directly generates and outputs the descriptors corresponding to the access information in chronological order of the obtaining of the access information; and
a host interface, coupled to the host device and the buffer memory, and comprising:
a descriptor pool, configured to receive and buffer the descriptors;
a routing manager, coupled to the descriptor pool and configured to sequentially select one descriptor from the buffered descriptors as a latest descriptor according to the tag values and provide the latest descriptor to a direct memory access (DMA) engine; and
the DMA engine, coupled to the routing manager and configured to read the buffer memory according to the latest descriptor to obtain at least a portion of the predetermined data.

10. The memory controller as claimed in claim 9, wherein the routing manager comprises:
a plurality of routing engines, respectively corresponding to different slot numbers, each being configured to retrieve one descriptor having the same slot number thereof from the buffered descriptors as a target descriptor according to a predetermined order of the tag values; and a descriptor output device, coupled to the routing engines and configured to receive the target descriptors from the routing engines and sequentially select one of the target descriptors as the latest descriptor.

11. The memory controller as claimed in claim 10, wherein the predetermined order is an increasing order.

12. The memory controller as claimed in claim 10, wherein the portions of the predetermined data are assigned the same slot number.

13. The memory controller as claimed in claim 10, wherein different slot numbers are corresponding to different read commands.

14. The memory controller as claimed in claim 10, wherein the access information corresponding to each portion of the predetermined data and provided by the memory interface comprises the slot number and the tag value corresponding to said each portion of the predetermined data.

15. The memory controller as claimed in claim 10, wherein the portions of the predetermined data are assigned different but consecutive tag values, the microprocessor disregards the predetermined order of the tag values and simply outputs the descriptors corresponding to the access information in chronological order of the obtaining of the access information.

* * * * *